J. A. STEINMETZ.
AIRCRAFT CONSTRUCTION.
APPLICATION FILED JAN. 8, 1918.
1,332,930.  Patented Mar. 9, 1920.
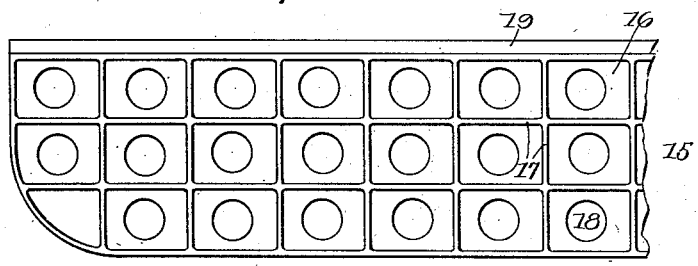
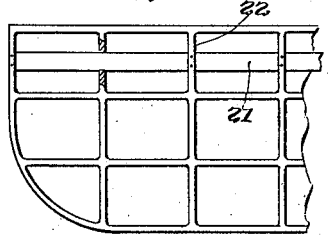
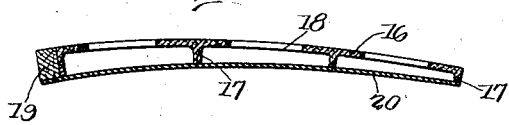
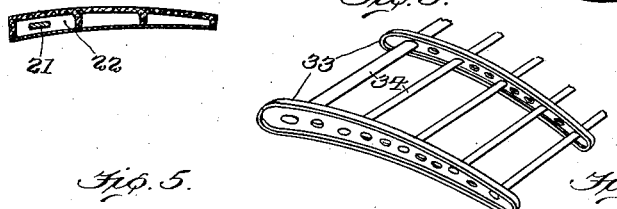
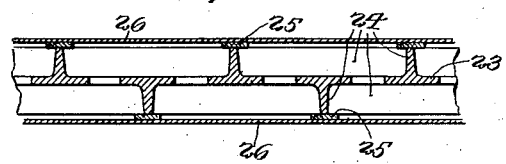
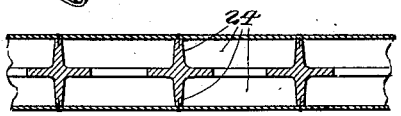
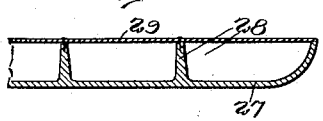
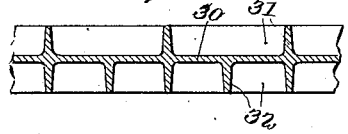
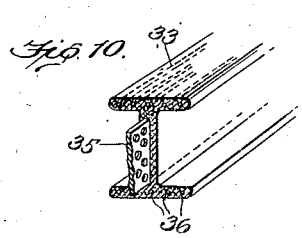
Inventor
Joseph A. Steinmetz
By Greene & Greene,
Attorneys.

UNITED STATES PATENT OFFICE.

JOSEPH A. STEINMETZ, OF PHILADELPHIA, PENNSYLVANIA.

AIRCRAFT CONSTRUCTION.

1,332,930.  Specification of Letters Patent.  Patented Mar. 9, 1920.

Application filed January 8, 1918. Serial No. 210,888.

*To all whom it may concern:*

Be it known that I, JOSEPH A. STEINMETZ, a citizen of the United States, and resident of Philadelphia, in the county of Philadelphia and State of Pennsylvania, have invented certain new and useful Improvements in Aircraft Construction, of which the following is a specification, reference being had therein to the accompanying drawing.

This invention relates to planes and other light portions of aircraft, and its object is to combine lightness and strength and to promote rapidity of manufacture, while using, largely, labor at comparatively low wages.

These ends are sought by making the framework of wings, planes, or other desired members by pressing plastic material, for example, papier mâché, reinforced if desired, into proper forms, and when desired incorporating therein strong threads of metal or other material.

In the accompanying drawings,

Figure 1 is a plan view of the body portion of an aeroplane wing or plane.

Fig. 2 is a cross section of the plane of Fig. 1.

Fig. 3 shows a slightly modified construction.

Fig. 4 is a cross sectional view of the structure of Fig. 3.

Fig. 5 is a similar cross sectional view showing a further modification.

Fig. 6 shows an enlarged cross section of a portion of a structure having ribs on both faces of the body sheet.

Fig. 7 is a cross sectional view illustrating the use of a smooth sheet of pressed material having on one face canvas receiving ribs.

Fig. 8 illustrates the use of a central web having an unequal number of ribs on its two faces.

Fig. 9 shows a portion of a modified wing framework.

Fig. 10 is a perspective view illustrating a desirable form of reinforced member such as is shown in Fig. 9.

In these figures, 15 designates the body of a supporting "plane" of primarily plastic material pressed to form a sheet 16 having on one face integral intersecting ribs 17 and provided with weight-reducing openings 18. Along one margin the sheet is preferably fixed to a wood member 19, and the ribs preferably decrease in height as their distance from this member increases. To the margins of the ribs a sheet 20 of canvas or the like is secured, usually by nails driven through the canvas into the ribs.

Figs. 3 and 4 omit the member 19 and show instead a light wood strip 21 passed through the transverse ribs 22.

Fig. 5 shows a body sheet 23 having non-registering ribs 24 on the free edges of which flat wood strips 25 are fixed, to receive canvas sheets 26.

In the form of Fig. 6 the ribs register and the wood strips 25 are omitted.

Fig. 7 illustrates a continuous imperforate sheet having on one face ribs 28 to which canvas 29 is nailed.

In some cases, as shown in Fig. 8, a continuous sheet 30 is provided with ribs 31 and on the opposite face with more numerous ribs 32.

A very rapidly made and assembled framework is shown in Fig. 9, where 33 represents duplicate transverse papier mâché wing ribs readily pressed to form in suitable dies. These are properly spaced parallel to each other and connected by longitudinal strips 34 passing through all the ribs. The ribs are preferably of I-beam cross section, as shown in Fig. 10, and where great strength is desired are provided with a stiffening, preferably perforated, plate 35 in each connecting web and with wires 36, or the like, in the webs transverse to the planes of the connecting webs.

When the initially plastic material contains throughout its mass numerous strong threads of grass, common textile material, or metal, it has great strength for a given weight, pressed forms give stiffness, and when dies are once made, any number of duplicate parts can be produced with great rapidity and with very little skill, no careful fitting and connection by expensive mechanics being necessary.

What I claim is:

1. In a supporting plane for aircraft, the combination with a pressed pulp sheet having on its face a series of integral ribs, of an approximately parallel sheet secured to the edges of said ribs, substantially as set forth.

2. In a supporting plane for aircraft, the combination with a pressed pulp sheet having on its face a series of integral ribs intersected by the ribs of a second series of like height, of a fabric sheet secured to the marginal faces of the ribs, substantially as set forth.

3. In a supporting plane for aircraft, the combination with a papier mâché sheet having on both faces intersecting integral ribs and provided with openings in the several spaces surrounded by the ribs, and thin sheets of different material secured to the edges of the ribs on each face of the sheet first mentioned.

4. A structural unit for aircraft consisting of a rib of primarily plastic material of I-beam cross section having in its marginal web reinforcing wires and in its connecting web a stiffening plate.

In testimony whereof I hereunto affix my signature.

JOSEPH A. STEINMETZ.